United States Patent
Park

(10) Patent No.: US 10,066,776 B2
(45) Date of Patent: *Sep. 4, 2018

(54) PIPE MULTIFOLD LINE PLUG WITH FLUID OPENING

(71) Applicant: Kwon J. Park, Diamond Bar, CA (US)

(72) Inventor: Kwon J. Park, Diamond Bar, CA (US)

(*) Notice: Subject to any disclaimer, the term of this patent is extended or adjusted under 35 U.S.C. 154(b) by 60 days.

This patent is subject to a terminal disclaimer.

(21) Appl. No.: 15/242,926

(22) Filed: Aug. 22, 2016

(65) Prior Publication Data

US 2018/0051842 A1  Feb. 22, 2018

(51) Int. Cl.
| | |
|---|---|
| F16L 55/11 | (2006.01) |
| E03C 1/00 | (2006.01) |
| F16L 41/00 | (2006.01) |
| F16L 55/07 | (2006.01) |
| F16L 55/132 | (2006.01) |

(52) U.S. Cl.
CPC ............ F16L 55/1108 (2013.01); E03C 1/00 (2013.01); F16L 41/008 (2013.01); F16L 55/07 (2013.01); F16L 55/132 (2013.01)

(58) Field of Classification Search
CPC .......................... F16L 55/1141; F16L 55/1108
USPC .......................................................... 138/89
See application file for complete search history.

(56) References Cited

U.S. PATENT DOCUMENTS

| | | | | | |
|---|---|---|---|---|---|
| 1,997,878 | A | * | 4/1935 | Wagner ................. | F16L 55/132 138/89 |
| 2,375,995 | A | * | 5/1945 | Kaeser ................. | G01M 3/022 138/89 |
| 3,704,729 | A | * | 12/1972 | Tomlinson ............... | E03F 7/02 138/90 |
| 4,209,163 | A | * | 6/1980 | Nordskog ............... | F16K 27/07 137/351 |
| 4,529,007 | A | * | 7/1985 | Goforth ................ | F16L 55/132 138/89 |
| 4,602,500 | A | * | 7/1986 | Kelly .................... | G01M 3/022 138/90 |
| 5,224,516 | A | * | 7/1993 | McGovern ............ | F16L 55/132 138/89 |
| 5,363,881 | A | * | 11/1994 | Larkin .................. | F16L 55/132 138/89 |
| 2011/0258834 | A1 | * | 10/2011 | Allen .................... | F16L 55/132 29/525 |

* cited by examiner

*Primary Examiner* — Craig Schneider
*Assistant Examiner* — David Deal
(74) *Attorney, Agent, or Firm* — John K. Park; Park Law Firm

(57) ABSTRACT

A pipe ML plug with fluid opening includes a main pipe portion, a rubber tube portion, a lower fixer, and an upper fixer. The rubber tube portion is disposed around a length portion of the main pipe portion and at the lower end of the main pipe portion, has a second inner diameter and a second outer diameter and extending straight for a second length, has a lower end and an upper end, and increases a blocking diameter when compressed lengthwise. The lower fixer and the upper fixer are configured for fixing a distance therebetween, so as to press the rubber tube portion lengthwise from both of the lower and upper ends to a specific length and thus to make the rubber tube portion bulge to a specific diameter, so that the bulged rubber tube portion blocks and seals an external pipe from inside.

11 Claims, 3 Drawing Sheets

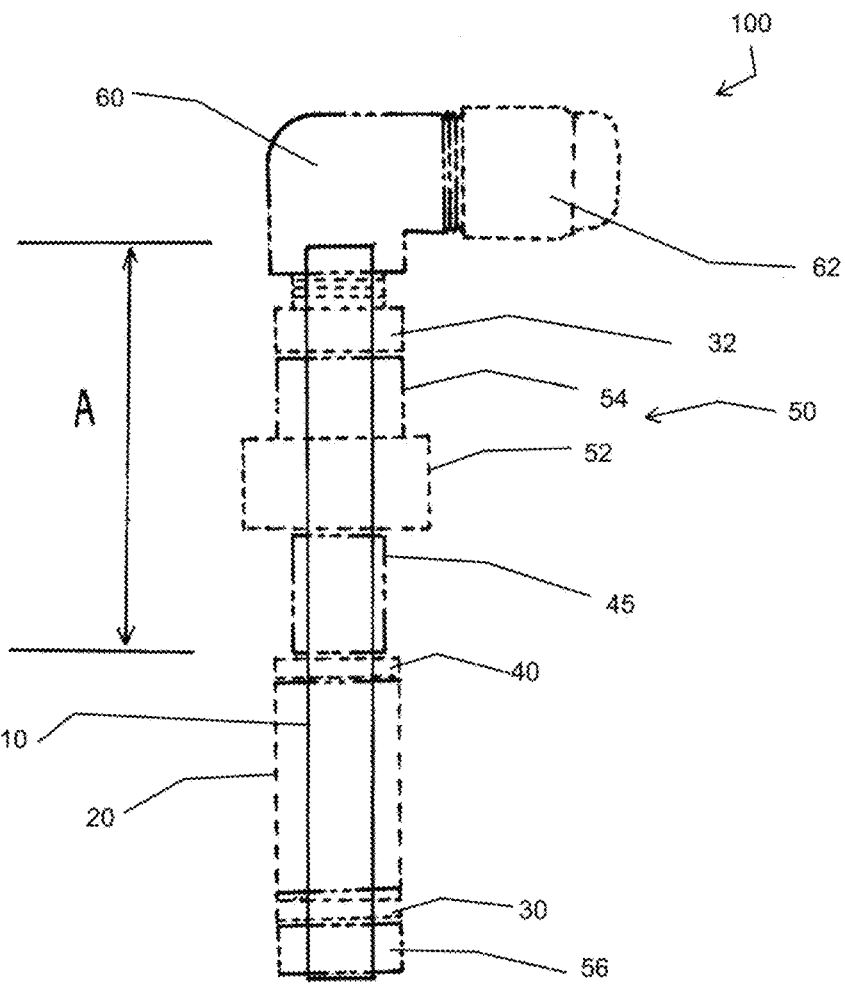
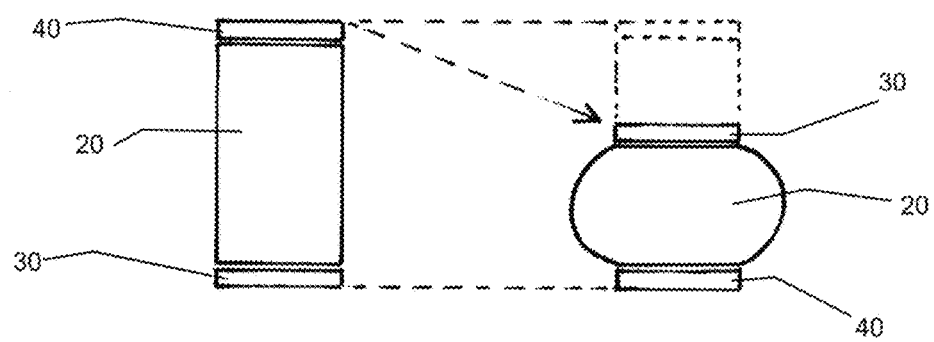

PIPE MULTIFOLD LINE PLUG WITH FLUID OPENING

BACKGROUND OF THE INVENTION

The present invention relates to a pipe multifold line plug with fluid opening.

Plumbing work under multifold line structure is challenging for many well-known reasons.

In most of the cases, conventional tools for the work turn out to be not that helpful, sometimes almost useless.

Especially, it is very difficult to handle situations that need testing of under-slab water leak, so called "slab leak".

As discussed before, the maze of pipe lines and the tightness of space there in the multifold line make the problem much worse than in a situation with a regular single line in an open space.

Accordingly, a need for a pipe multifold line plug with fluid opening has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a pipe multifold line (ML) plug with fluid opening.

An aspect of the invention provides a pipe ML plug with fluid opening, which comprises a main pipe portion, a rubber tube portion, a lower fixer, and an upper fixer.

The main pipe portion has a first inner diameter and a first outer diameter and extends straight for a first length having a lower end and an upper end.

The rubber tube portion is disposed around a length portion of the main pipe portion and at the lower end of the main pipe portion, has a second inner diameter and a second outer diameter and extending straight for a second length, has a lower end and an upper end, and is configured to increase a blocking diameter when compressed lengthwise.

The lower fixer is disposed at the lower end of the main pipe portion so as to be fixed to the main pipe portion and to limit moving of the lower end of the rubber tube portion in a downward direction.

The upper fixer is disposed at a position of the main pipe portion where the upper end of the rubber tube portion is located, so as to be fixed movably to the main pipe portion and to limit moving of the upper end of the rubber tube portion in an upward direction.

The lower fixer and the upper fixer are configured for fixing a distance therebetween, so as to press the rubber tube portion lengthwise from both of the lower and upper ends to a specific length and thus to make the rubber tube portion bulge to a specific diameter, so that the bulged rubber tube portion blocks and seals an external pipe from inside.

The pipe ML plug with fluid opening may further comprise an adjuster provided around the main pipe portion and configured for pressing on and holding the upper fixer so as to shorten the length of the rubber tube portion and to bulge the diameter of the rubber tube portion to a specific diameter, by engaging with the main pipe portion.

The adjuster may comprise a plurality of male threads and a plurality of female threads.

The plurality of male threads are provided on a portion of an outer surface of the main pipe portion between the upper end and the lower end of the main pipe portion.

The plurality of female threads are provided on a portion of an inner surface of the adjuster.

The adjuster engages the main pipe portion through the male and female threads, so as to adjust the position of the upper fixer along the main pipe portion.

The adjuster may be made integrally and monolithically with the upper fixer.

The adjuster may further comprise a first handle portion provided on an outer surface of the adjuster and configured to be held by a user hand for rotating the adjuster.

The adjuster may further comprise a second handle portion provided on an outer surface of the adjuster and configured to be held by a mechanical tool such as a wrench for rotating the adjuster.

The adjuster may further comprise a first handle portion and a second handle portion.

The first handle portion is provided on an outer surface of the adjuster and configured to be held by a user hand for rotating the adjuster.

The second handle portion is provided on an outer surface of the adjuster and configured to be held by a mechanical tool such as a wrench for rotating the adjuster.

The second handle is disposed on top of the first handle in the length direction of the adjuster.

The rubber tube portion may have an outer diameter substantially same as a diameter of the lower and upper fixers.

The rubber tube portion may be configured to be pressed lengthwise to bulge to a diameter larger than an original diameter.

The pipe ML plug with fluid opening may further comprise an L-shaped pipe portion and a cap portion.

The L-shaped pipe portion has a lower end vertically connected to the upper end of the main pipe portion and an upper end opening horizontally.

The cap portion is disposed at the upper end of the L-shaped pipe portion so as to close or open the upper end of the L-shaped pipe portion.

The upper end is configured to be connected to an air-supplying pipe for leak testing in the external pipe to which the lower portion of the pipe ML plug is inserted and connected.

The L-shaped pipe portion may be connected to the main pipe portion through male and female threads.

The L-shaped pipe portion and the main pipe portion may be made monolithically.

The pipe ML plug with fluid opening may further comprise a first hexagon nut and a second hexagon nut.

The first hexagon nut is disposed fixedly to the upper end portion of the main pipe portion for facilitating to hold or rotate the main pipe portion.

The second hexagon nut is disposed fixedly to the lower end portion of the main pipe portion for facilitating to hold or rotate the main pipe portion.

The pipe ML plug with fluid opening may further comprise a stopper having a blocking portion and a handle portion and configured to stop the flow of fluid in the main pipe portion.

The blocking portion may comprise a plurality of male threads, and a portion of the inner surface of the upper end of the main pipe portion may comprise a plurality of female threads. The male and female threads may be configured to engage and seal the upper end of the main pipe portion.

The advantages of the present invention are: (1) the pipe ML plug with fluid opening according to the invention provides an easy testing of a slab leak; and (2) the pipe ML plug with fluid opening according to the present invention provides a convenient tool in the multifold line situations.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 4 is a conceptual diagram showing the pipe multifold line plug with fluid of FIG. 1 with a main pipe portion in solid line and all other components in dashed lines and double short dashed lines; and FIG. 5 is a partial front views showing a rubber tube portion and lower and upper fixers under different compressing force of the pipe multifold line plug with fluid of FIG. 1.

DETAILED DESCRIPTION EMBODIMENTS OF THE INVENTION

Referring to the figures, the embodiments of the invention are described in detail.

Figure 1:
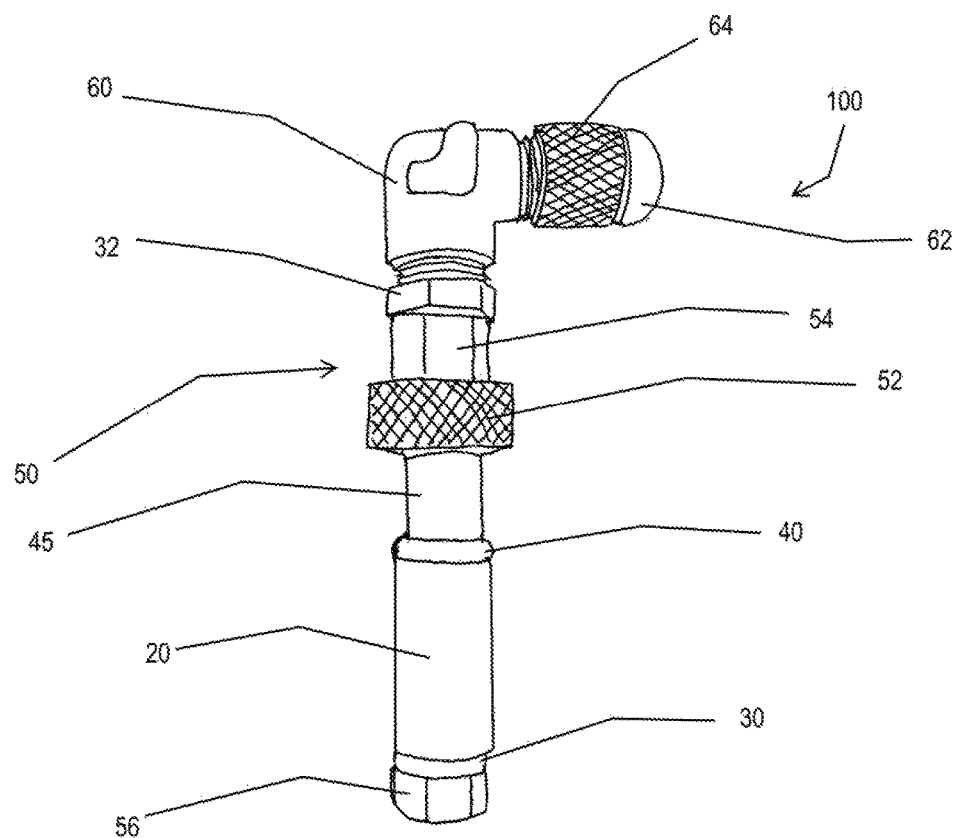
FIG. 1 is a side view showing a pipe multifold line plug with fluid opening having a cap engaged according to an embodiment of the invention.
Figure 2:
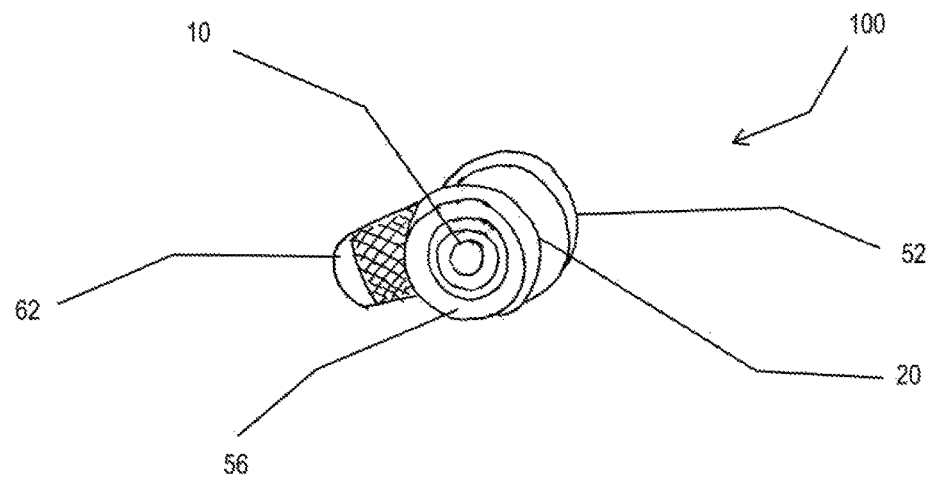
FIG. 2 is a bottom perspective view showing the pipe multifold line plug with fluid of FIG. 1.
Figure 3:
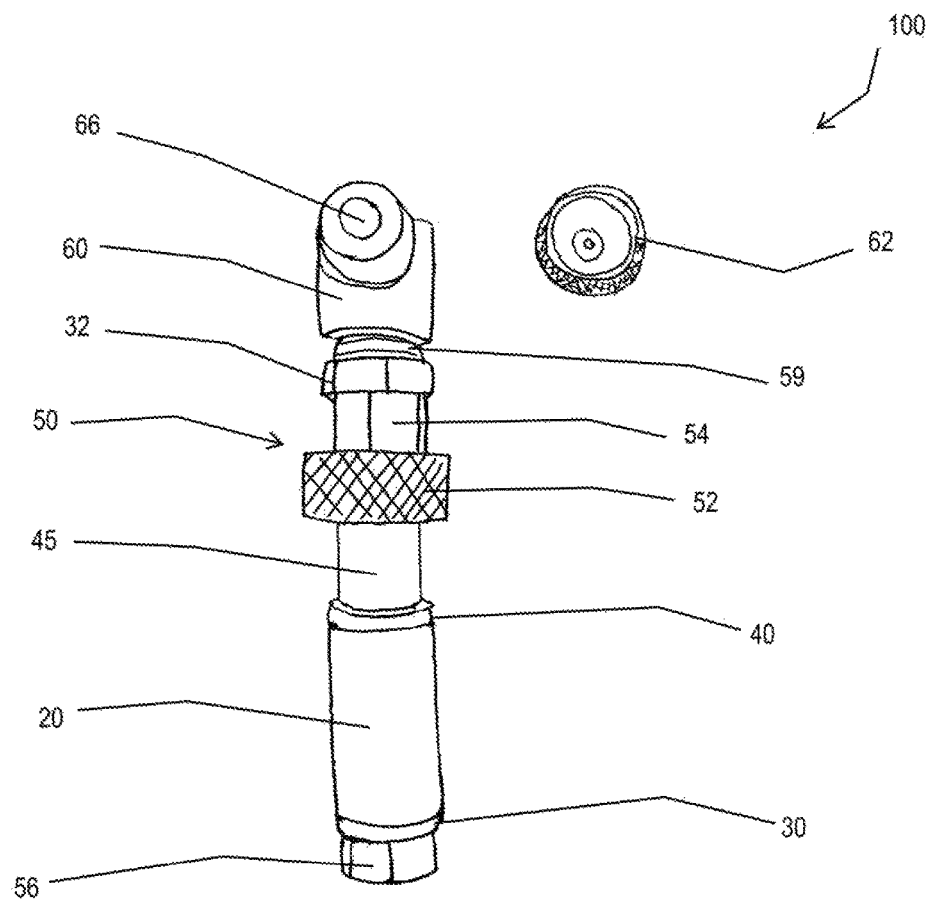
FIG. 3 is a front perspective view showing the pipe multifold line plug with fluid opening with the cap disengaged.

FIGS. 1 through 3 show a pipe multifold line plug with fluid opening according to an embodiment of the present invention.

An aspect of the invention provides a pipe ML plug 100 with fluid opening, which comprises a main pipe portion 10, a rubber tube portion 20, a lower fixer 30, and an upper fixer 40 as shown in FIGS. 1-3.

The main pipe portion 10 has a first inner diameter and a first outer diameter and extends straight for a first length having a lower end and an upper end.

The rubber tube portion 20 is disposed around a length portion of the main pipe portion 10 and at the lower end of the main pipe portion 10, has a second inner diameter and a second outer diameter and extending straight for a second length, has a lower end and an upper end, and is configured to increase a blocking diameter when compressed lengthwise as shown in FIG. 5.

The lower fixer 30 is disposed at the lower end of the main pipe portion 10 so as to be fixed to the main pipe portion 10 and to limit moving of the lower end of the rubber tube portion 20 in a downward direction as shown in FIG. 5.

The upper fixer 40 is disposed at a position of the main pipe portion 10 where the upper end of the rubber tube portion 20 is located, so as to be fixed movably to the main pipe portion 10 and to limit moving of the upper end of the rubber tube portion 20 in an upward direction as shown in FIG. 5.

The lower fixer 30 and the upper fixer 40 are configured for fixing a distance therebetween, so as to press the rubber tube portion 20 lengthwise from both of the lower and upper ends to a specific length and thus to make the rubber tube portion 20 bulge to a specific diameter, so that the bulged rubber tube portion 20 blocks and seals an external pipe (not shown) from inside as shown in FIG. 5.

The pipe ML plug 100 with fluid opening may further comprise an adjuster 50 provided around the main pipe portion 10 and configured for pressing on and holding the upper fixer 40 so as to shorten the length of the rubber tube portion 20 and to bulge the diameter of the rubber tube portion 20 to a specific diameter, by engaging with the main pipe portion 10 as shown in FIGS. 1, 3, and 4.

The adjuster 50 may comprise a plurality of male threads (not shown) and a plurality of female threads (not shown).

The plurality of male threads are provided on a portion of an outer surface of the main pipe portion 10 between the upper end and the lower end of the main pipe portion 10.

The plurality of female threads are provided on a portion of an inner surface of the adjuster 50.

The adjuster 50 engages the main pipe portion 10 through the male and female threads, so as to adjust the position of the upper fixer 40 along the main pipe portion 10.

The adjuster 50 may be made integrally and monolithically with the upper fixer 40.

The adjuster 50 may further comprise a first handle portion 52 provided on an outer surface of the adjuster 50 and configured to be held by a user hand for rotating the adjuster 50.

The adjuster 50 may further comprise a second handle portion 54 provided on an outer surface of the adjuster 50 and configured to be held by a mechanical tool such as a wrench for rotating the adjuster 50.

The adjuster 50 may further comprise a first handle portion and a second handle portion.

The first handle portion 52 is provided on an outer surface of the adjuster 50 and configured to be held by a user hand for rotating the adjuster 50.

The second handle portion 54 is provided on an outer surface of the adjuster 50 and configured to be held by a mechanical tool such as a wrench for rotating the adjuster 50.

The second handle portion 54 is disposed on top of the first handle portion 52 in the length direction of the adjuster 50.

The rubber tube portion 20 may have an outer diameter substantially same as a diameter of the lower and upper fixers 30, 40.

The rubber tube portion 20 may be configured to be pressed lengthwise to bulge to a diameter larger than an original diameter as shown in FIG. 5.

The pipe ML plug 100 with fluid opening may further comprise an L-shaped pipe portion 60 and a cap portion 62.

The L-shaped pipe portion 60 has a lower end vertically connected to the upper end of the main pipe portion 10 and an upper end opening 66 horizontally as shown in FIG. 3.

The cap portion 62 is disposed at the upper end of the L-shaped pipe portion 60 so as to close or open the upper end of the L-shaped pipe portion 60, and the cap portion 62 includes female threads provided on an inner surface thereof configured to engage male threads provided at the upper end of the L-shaped pipe portion 60 and a third handle portion 64 provided on an outer surface thereof.

The upper end is configured to be connected to an external air-supplying pipe (not shown) for leak testing in the external pipe to which the lower portion of the pipe ML plug 100 is inserted and connected.

The L-shaped pipe portion 60 may be connected to the main pipe portion 10 through male and female threads.

The L-shaped pipe portion 60 and the main pipe portion 10 may be made monolithically.

The pipe ML plug 100 with fluid opening may further comprise a first hexagon nut 32 and a second hexagon nut 56.

The first hexagon nut 32 is disposed fixedly to the upper end portion of the main pipe portion 10 for facilitating to hold or rotate the main pipe portion 10.

The second hexagon nut 56 is disposed fixedly to the lower end portion of the main pipe portion 10 for facilitating to hold or rotate the main pipe portion 10.

The pipe ML plug 100 with fluid opening may further comprise a stopper having a blocking portion and a handle portion and configured to stop the flow of fluid in the main pipe portion 10.

The blocking portion may comprise a plurality of male threads, and a portion of the inner surface of the upper end of the main pipe portion may comprise a plurality of female threads. The male and female threads may be configured to engage and seal the upper end of the main pipe portion 10.

The reference numeral 59 represents a connection between the L-shaped pipe portion 60 and the main pipe portion 10, which is well-known in the community.

The pipe ML plug 100 may further comprise a spacer 45 disposed between the adjuster 50 and the upper fixer 40 as shown in FIGS. 1 and 3. The spacer 45 is configured to slide freely on the main pipe portion 10. Its purpose is to provide extra extension to a compressing distance of the rubber tube portion 20 even when the adjuster 50 reaches the lowest portion with the male threads in the region "A".

The pipe ML plug 100 with fluid opening can be used to be inserted into an open end of an external pipe (not shown), for example from the lower end of the element 56 to the position of the upper fixer 40, and block a flow of liquid out of the external pipe by the means of the bulged rubber tube portion 20.

Alternatively, the cap 62 can be removed and another pipe can be connected there and air or water can be provided therethrough and toward the external pipe, for example for testing a leak.

One of the advantages of the pipe ML plug 100 with fluid opening is that the user can handle the tool, for example blocking and/or testing leak of a pipe with a single hand in a very small, narrow, or crowded space. Especially, since the pipe ML plug 100 with fluid opening has the L-shaped pipe portion 60, it can be touched and locked in place by another external pipe, especially in the ML structure. Therefore, the user still can insert the pipe ML plug 100 with fluid opening into the external pipe, rotates the first handle portion 52 and engages them together, and uses another tool such as a wrench still with a single hand in order to tighten or do something about the pipe ML plug 100.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A pipe ML plug with fluid opening comprising:
   a main pipe portion having a first inner diameter and a first outer diameter and extending straight for a first length having a lower end and an upper end;
   a rubber tube portion disposed around a length portion of the main pipe portion and at the lower end of the main pipe portion, having a second inner diameter and a second outer diameter and extending straight for a second length, having a lower end and an upper end, and configured to increase a blocking diameter when compressed lengthwise;
   a lower fixer disposed at the lower end of the main pipe portion so as to be fixed to the main pipe portion and to limit moving of the lower end of the rubber tube portion in a downward direction; and
   an upper fixer disposed at a position of the main pipe portion where the upper end of the rubber tube portion is located, so as to be fixed movably to the main pipe portion and to limit moving of the upper end of the rubber tube portion in an upward direction,
   wherein the lower fixer and the upper fixer are configured for fixing a distance therebetween, so as to press the rubber tube portion lengthwise from both of the lower and upper ends to a specific length and thus to make the rubber tube portion bulge to a specific diameter, so that the bulged rubber tube portion blocks and seals an external pipe from inside,
   further comprising an adjuster provided around the main pipe portion and configured for pressing on and holding the upper fixer so as to shorten the length of the rubber tube portion and to bulge the diameter of the rubber tube portion to a specific diameter, by engaging with the main pipe portion,
   wherein the adjuster comprises:
   a plurality of male threads provided on a portion of an outer surface of the main pipe portion between the upper end and the lower end of the main pipe portion; and
   a plurality of female threads provided on a portion of an inner surface of the adjuster,
   wherein the adjuster engages the main pipe portion through the male and female threads, so as to adjust the position of the upper fixer along the main pipe portion,
   wherein the adjuster further comprises a first handle portion provided on an outer surface of the adjuster and configured to be held by a user hand for rotating the adjuster,
   further comprising:
   an L-shaped pipe portion having a lower end vertically connected to the upper end of the main pipe portion and an upper end opening horizontally; and
   a cap portion disposed at the upper end of the L-shaped pipe portion so as to close or open the upper end of the L-shaped pipe portion and including female threads provided on an inner surface thereof configured to engage male threads provided at the upper end of the L-shaped pipe portion and a third handle portion provided on an outer surface thereof,
   wherein the upper end of the L-shaped pipe portion is configured to be connected to an air-supplying pipe for leak testing in the external pipe to which the lower portion of the pipe ML plug is inserted and connected.

2. The pipe ML plug with fluid opening of claim 1, wherein the adjuster is made integrally and monolithically with the upper fixer.

3. The pipe ML plug with fluid opening of claim 1, wherein the adjuster further comprises a second handle portion provided on an outer surface of the adjuster and configured to be held by a mechanical tool such as a wrench for rotating the adjuster.

4. The pipe ML plug with fluid opening of claim 1, wherein the second handle is disposed on top of the first handle in the length direction of the adjuster.

5. The pipe ML plug with fluid opening of claim 1, wherein the rubber tube portion has an outer diameter substantially same as a diameter of the lower and upper fixers.

6. The pipe ML plug with fluid opening of claim 5, wherein the rubber tube portion is configured to be pressed lengthwise to bulge to a diameter larger than an original diameter.

7. The pipe ML plug with fluid opening of claim 1, wherein the L-shaped pipe portion is connected to the main pipe portion through male and female threads.

8. The pipe ML plug with fluid opening of claim 1, wherein the L-shaped pipe portion and the main pipe portion are made monolithically.

9. The pipe ML plug with fluid opening of claim 1, further comprising:

a first hexagon nut disposed fixedly to the upper end portion of the main pipe portion for facilitating to hold or rotate the main pipe portion; and a second hexagon nut disposed fixedly to the lower end portion of the main pipe portion for facilitating to hold or rotate the main pipe portion.

10. The pipe ML plug with fluid opening of claim 1, further comprising a stopper having a blocking portion and a handle portion and configured to stop the flow of fluid in the main pipe portion.

11. The pipe ML plug with fluid opening of claim 10, wherein the blocking portion comprises a plurality of male threads, wherein a portion of the inner surface of the upper end of the main pipe portion comprises a plurality of female threads, and wherein the male and female threads are configured to engage and seal the upper end of the main pipe portion.

* * * * *